United States Patent
Derrez et al.

(10) Patent No.: US 10,293,918 B2
(45) Date of Patent: May 21, 2019

(54) DEVICE FOR FIXING BLADES WITH VARIABLE PITCH OF A NON-STREAMLINED TURBOMACHINE PROPELLER

(71) Applicant: SNECMA, Paris (FR)

(72) Inventors: Charles-Henri Michel Marie Derrez, Moissy-Cramayel (FR); Adrien Jacques Philippe Fabre, Moissy-Cramayel (FR); Christophe Paul Jacquemard, Moissy-Cramayel (FR); Régis Eugène Henri Servant, Moissy-Cramayel (FR); Sébastien Emile Philippe Tajan, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 466 days.

(21) Appl. No.: 15/116,868

(22) PCT Filed: Feb. 10, 2015

(86) PCT No.: PCT/FR2015/050325
§ 371 (c)(1),
(2) Date: Aug. 5, 2016

(87) PCT Pub. No.: WO2015/121579
PCT Pub. Date: Aug. 20, 2015

(65) Prior Publication Data
US 2017/0166295 A1   Jun. 15, 2017

(30) Foreign Application Priority Data

Feb. 14, 2014  (FR) ..................................... 14 51210

(51) Int. Cl.
*B64C 11/06* (2006.01)
*B64C 11/48* (2006.01)
(Continued)

(52) U.S. Cl.
CPC .............. *B64C 11/06* (2013.01); *B64C 11/14* (2013.01); *B64C 11/18* (2013.01); *B64C 11/48* (2013.01);
(Continued)

(58) Field of Classification Search
CPC ......... B64C 11/04; B64C 11/06; B64C 11/14; B64C 11/18; B64C 11/30; B64C 11/32;
(Continued)

(56) References Cited

U.S. PATENT DOCUMENTS

| 4,738,590 A * | 4/1988 | Butler .................... B64C 11/32 416/129 |
| 4,738,591 A * | 4/1988 | Butler .................... B64C 11/32 416/129 |
| 4,863,352 A * | 9/1989 | Hauser .................... B64C 11/06 416/204 R |
| 4,968,217 A * | 11/1990 | Newton .................. B64C 11/32 416/147 |

(Continued)

FOREIGN PATENT DOCUMENTS

| FR | 2 943 312 A1 | 9/2010 |
| FR | 2 955 083 A1 | 7/2011 |
| WO | WO 2014/044970 A1 | 3/2014 |

*Primary Examiner* — Ninh H. Nguyen
*Assistant Examiner* — Wayne A Lambert
(74) *Attorney, Agent, or Firm* — Blank Rome LLP

(57) ABSTRACT

The invention relates to a device (12) for a non-streamlined propeller (6, 7) with blades (10) having variable pitch of a turbomachine (1), the device comprising a support (15) intended to support a blade (10) and including a cylindrical foot (17), a bearing comprising a radially internal annular section (20) and a radially external annular section (21) capable of pivoting with respect to each other, the foot (17) being mounted in said internal section (20) of the bearing. The device comprises a hub (27) mounted in the foot (17), said hub (27) including a rim (29) comprising a face (30) coming to bear on the radially internal annular section (20) of the bearing, the hub (27) and the foot (17) of the support (Continued)

Figure 1:
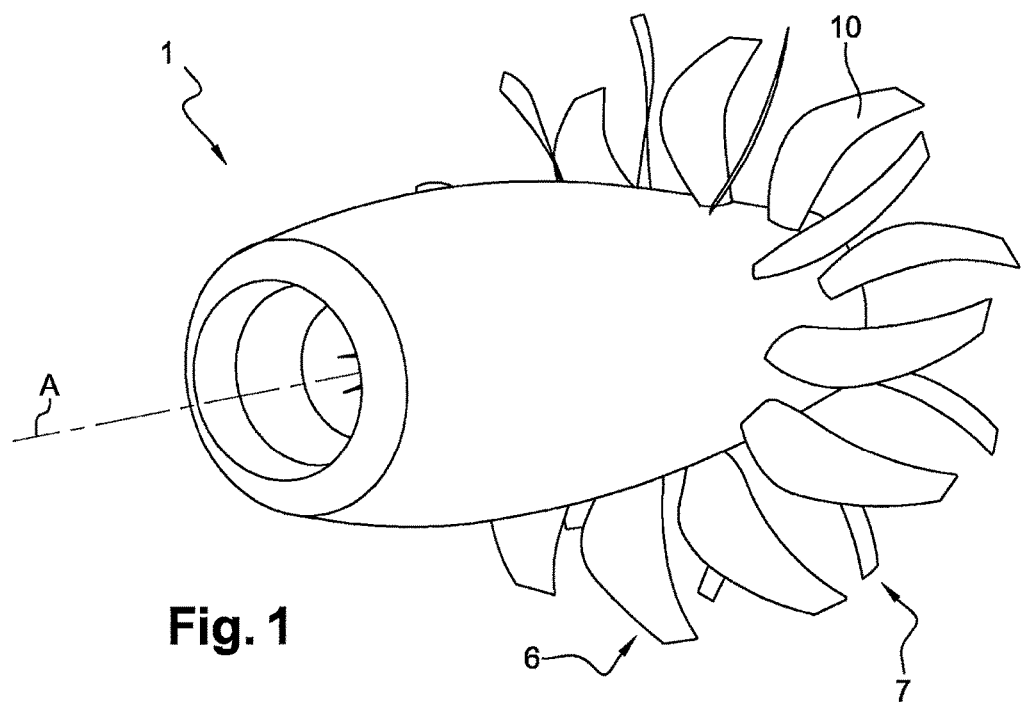

(15) comprising complementary engagement elements (18, 28) interacting with a locking component (23).

10 Claims, 7 Drawing Sheets

(51) Int. Cl.
  *B64C 11/14* (2006.01)
  *B64C 11/18* (2006.01)
  *B64C 27/00* (2006.01)
  *F02K 3/02* (2006.01)
(52) U.S. Cl.
  CPC .......... *B64C 2027/005* (2013.01); *F02K 3/02* (2013.01); *Y02T 50/66* (2013.01)
(58) Field of Classification Search
  CPC ....... B64C 11/325; B64C 11/44; B64C 11/48; B64C 2027/002; B64C 2027/003; B64C 2027/005; F02K 3/02; Y02T 50/66; F04D 29/056; F04D 29/323; F04D 29/362; F05D 2250/90; F05D 2260/74; F05D 2260/79
  See application file for complete search history.

(56) References Cited

U.S. PATENT DOCUMENTS

| | | | | |
|---|---|---|---|---|
| 5,154,372 | A * | 10/1992 | Hora | F01D 1/24 244/62 |
| 5,263,898 | A * | 11/1993 | Elston, III | B64C 11/06 416/129 |
| 8,382,442 | B2 * | 2/2013 | Boston | B64C 11/06 416/174 |
| 8,622,699 | B2 * | 1/2014 | Gallet | B64C 11/04 416/2 |
| 9,102,396 | B2 * | 8/2015 | Curren | B64C 11/04 |
| 9,145,776 | B2 * | 9/2015 | Mackie | F01D 5/30 |
| 9,429,031 | B2 * | 8/2016 | Perdrigeon | F01D 5/3023 |
| 2010/0239421 | A1 | 9/2010 | Boston et al. | |
| 2011/0110781 | A1 * | 5/2011 | Dao | B64C 11/06 416/205 |
| 2012/0321476 | A1 * | 12/2012 | Mackie | F01D 5/30 416/220 R |
| 2013/0094943 | A1 * | 4/2013 | Bouru | B64C 11/06 415/170.1 |
| 2014/0341739 | A1 * | 11/2014 | Tajan | B64C 11/346 416/147 |
| 2015/0204339 | A1 * | 7/2015 | Belmonte | B64C 11/06 416/147 |
| 2016/0017728 | A1 * | 1/2016 | Fabre | F01D 7/00 416/135 |

* cited by examiner

DEVICE FOR FIXING BLADES WITH VARIABLE PITCH OF A NON-STREAMLINED TURBOMACHINE PROPELLER

The present invention relates to a device for fixing blades with variable pitch of a non-streamlined turbomachine propeller.

Such a propeller is also called an «open rotor» or «unducted fan».

Such type of turbomachine comprises two co-axial and contra-rotating external propellers, respectively upstream and downstream, which are, each, driven into rotation by a turbine of the turbomachine, and which extend substantially radially outside the nacelle of such turbomachine.

Each propeller comprises a polygonal rotor element which comprises cylindrical recesses distributed around the axis of the turbomachine and wherein propeller blades supports are mounted. Each blade for instance comprises a foot having a dovetail section which is engaged in a groove having a shape matching that of the support.

A bearing comprising a radially internal annular part (internal refers here to the foot axis), rotationally coupled to the support foot, and a radially external annular part is associated to each blade support, with said internal and external parts being able to pivot relative to each other, for instance through rolling elements such as rolls.

The supports and the internal parts of the bearings can rotate in the recesses of the rotor element and are driven into rotation about the axes of the blades of the feet by shafts, so as to adjust the angular setting of the blades, and to optimize such setting, according to the turbomachine operating conditions.

Several techniques are known for rotationally coupling the support foot and the internal annular part of the bearing.

A first technique consists in screwing the foot into the internal part, as is known from the document U.S. Pat. No. 5,263,898.

In operation, the propeller blades are subjected to very high centrifugal stress which may reach 60,000 daN, with such stress being transmitted to the rotor element through the supports, the internal parts of the bearing and thrust roller bearings. Such stress is specifically transmitted through the threads enabling the screwing of the foot into the internal part of the foot. Now such threads are not designed to transmit such stress and may quickly be damaged, thus limiting the service life of the propeller. Such a solution is further complex and expensive, and is additionally bulky. Using such threads may further generate cracking risks, specifically when titanium alloy is used for the foot.

Another known technique of the document FR 2 943 312 in the name of the Applicant, consists in engaging the foot into the internal part of the bearing.

For this purpose, the support foot and the radially internal part of the bearing comprise complementary engagement elements, specifically teeth, suitable for enabling the axial insertion of the support foot into the internal part of the bearing, in a first angular position of the foot relative to the internal part, and suitable for axially holding the foot in position in the internal part, in a second angular position, through the axial resting of the engagement teeth of the foot on the engagement teeth of the internal part. Wedges are circumferentially mounted between the engagement teeth of the foot and the internal part of the foot so as to prevent the foot from rotating relative to the internal part when these are in the second angular position thereof and thus so as to prevent any detachment of the foot from the internal element of the bearing.

Such stress is transmitted from each blade support and the internal part of the associated bearing by relatively large resting surfaces, i.e. the teeth resting surfaces, and not by threads, which are relatively fragile. Any premature deterioration of the propeller can thus be prevented.

However, such document does not provide for shrinking means, i.e. which provide a tight mounting or fitting, of the support foot in the internal element of the bearing. Such shrinking is desired in order to avoid generating vibrations, in operation, and consequently a premature deterioration of the bearing.

The invention more particularly aims at providing a simple, efficient and cost-effective solution to the above problems.

For this purpose, it provides for a device for a non-streamlined propeller with blades having variable pitch of a turbomachine, with the device comprising a support intended to support a blade in a distal area and including a cylindrical foot in a proximal area, with a bearing comprising a radially internal annular section and a radially external annular section, with said internal and external parts being capable of pivoting with respect to each other, with the foot being mounted in said internal section of the bearing, characterized in that it comprises a hub mounted in the foot, with said hub comprising a rim comprising a resting face oriented towards the distal end of the hub and resting on the radially internal annular part of the bearing, with the hub and the foot of the support comprising complementary engagement elements able to enable the axial insertion of the hub into the foot of the support, in a first angular position of the hub relative to said foot and able to axially hold the hub in position in said foot, in a second relative angular position, through an axial resting of the engagement elements of the hub against the complementary engagement elements of the foot, or vice versa, with the device further comprising a locking components able to lock the hub relative to the foot, in the second angular position.

The engagement elements between the hub and the foot, on the one hand, and the hub rim resting on the internal part of the bearing, on the other hand, enable the device to resist high centrifugal stress.

The foot preferably comprises a radially external cylindrical surface, with said foot being tightened or shrunk in a cylindrical recess of the internal part of the bearing.

The vibrations and possible premature deterioration of the bearing mentioned above can thus be avoided.

As the engagement elements are positioned inside the foot, an efficient shrinking can be obtained over the entire height and the entire circumference of the cylindrical external surface of the foot.

The support may be made of a titanium alloy, so as to reduce the weight of the device. Besides, the internal part of the bearing may be made of steel. Eventually, the hub may be made of a Nickel-based super-alloy, for instance Inconel 718.

The engagement elements may have teeth.

The locking component may then have at least one tooth mounted between two engagement teeth of the foot and the hub.

Besides, the locking component is capable of sliding relative to the foot and to the hub, between a locking position in which it prevents the hub from rotating relative to the foot, and a release position in which it enables the rotation of the hub relative to the foot.

Besides, the device may comprise means for fixing the locking element in the locking position thereof.

Besides, the hub may comprise a ribbed recess opening at the distal end of the hub, so as to enable a rotational coupling with a ribbed end of a shaft. Such shaft makes it possible to control the pitch of the corresponding blade.

The foot may comprise a recess, with engagement teeth radially extending inwards from the internal surface of the recess, in the area of the proximal end of the foot, with the hub comprising complementary engagement teeth which radially extend outwards, in the area of the distal end of the hub, and cooperating with the engagement teeth of the foot, with the locking component being engaged into the recess of the foot and comprising teeth inserted each time between the teeth of the foot and the hub, so as to prevent the hub from rotating relative to the foot.

The invention also relates to a turbomachine, characterized in that it comprises at least one device of the above-mentioned type.

Figure 2:
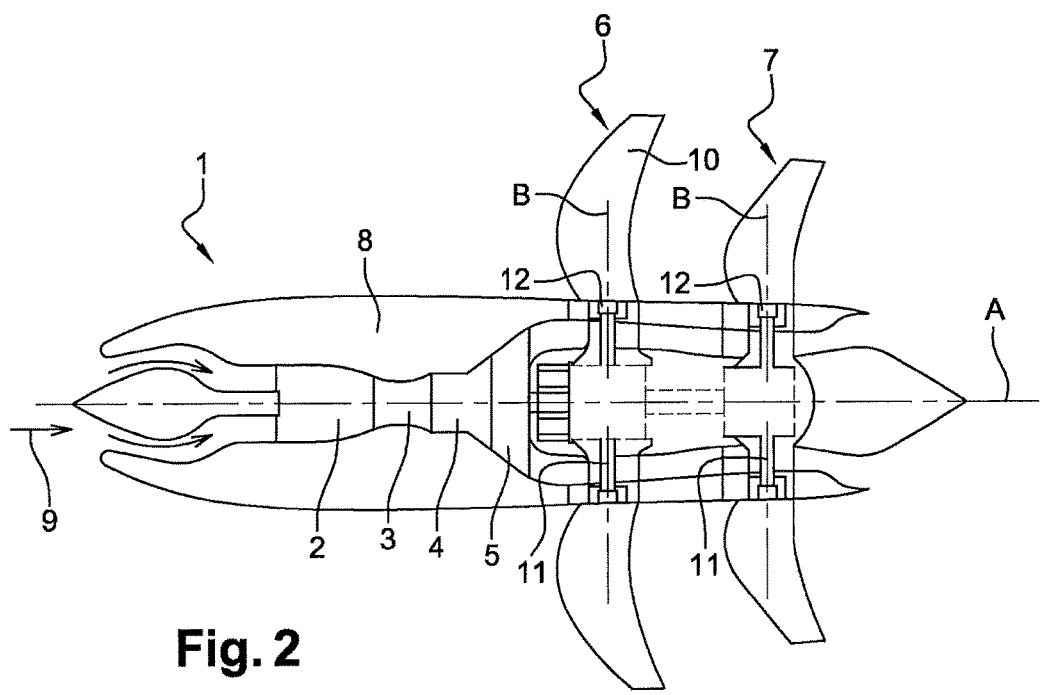
Figure 3:
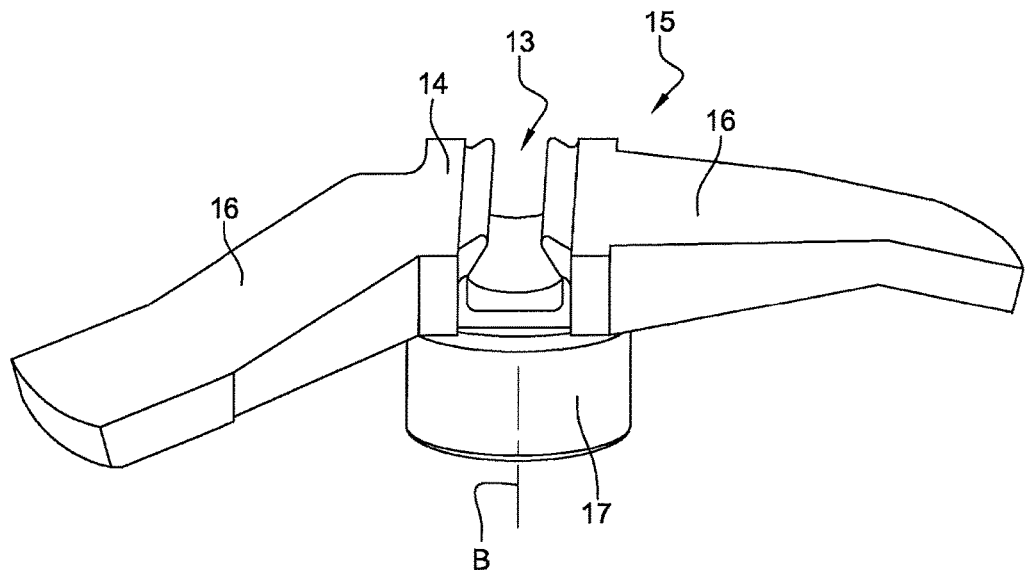
Figure 4:
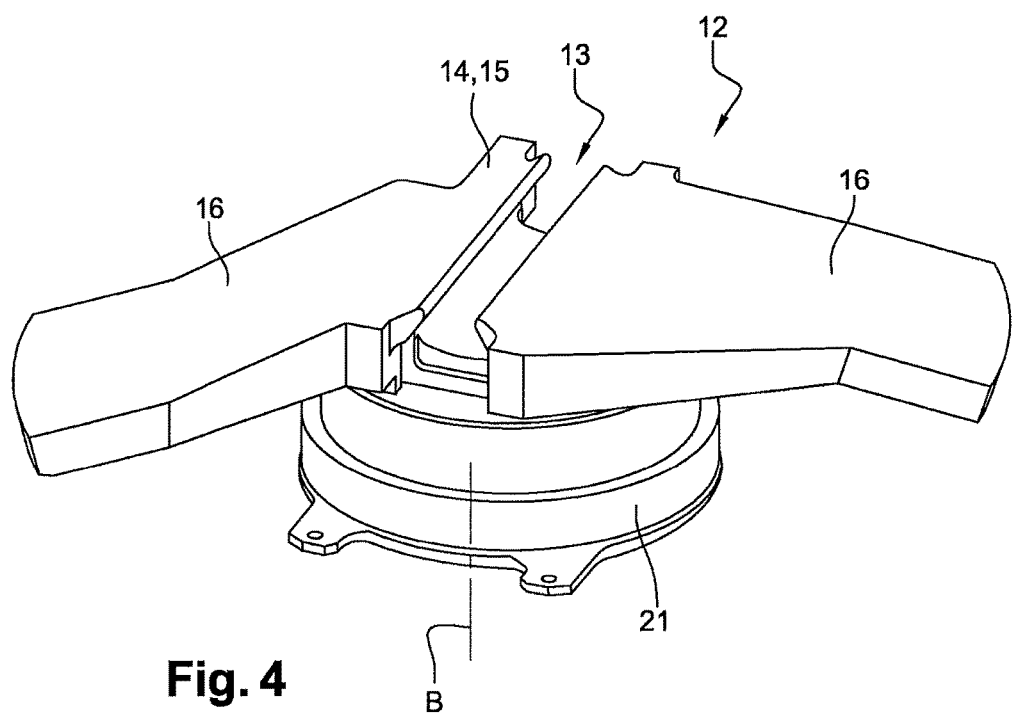
Figure 5:
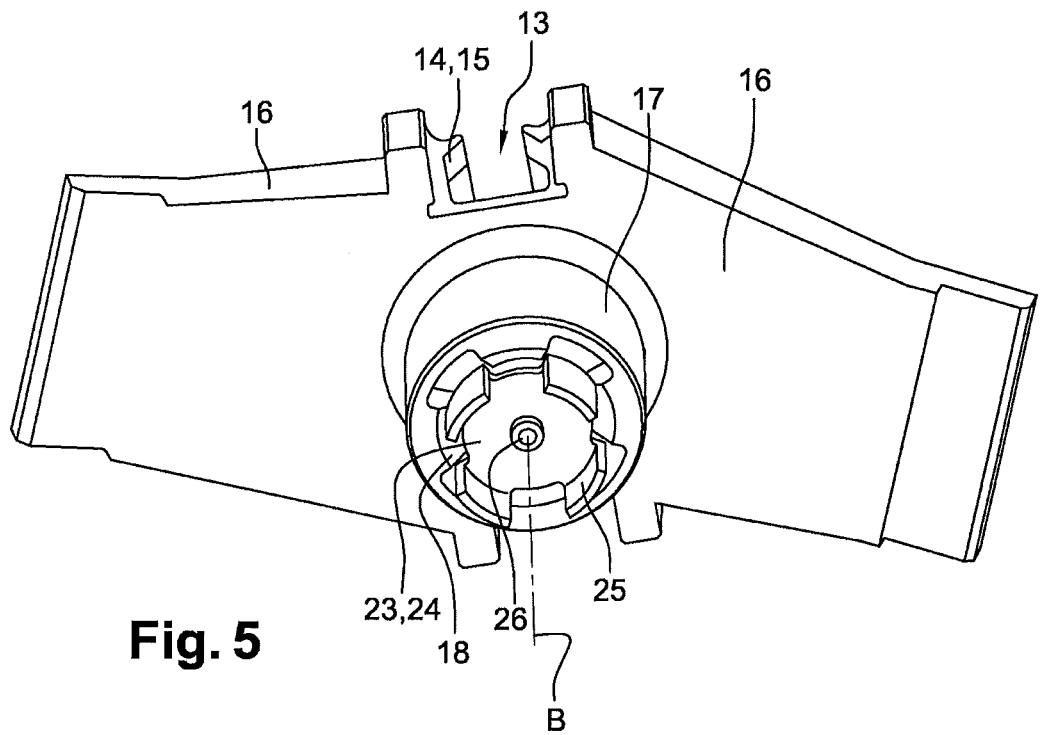
Figure 6:
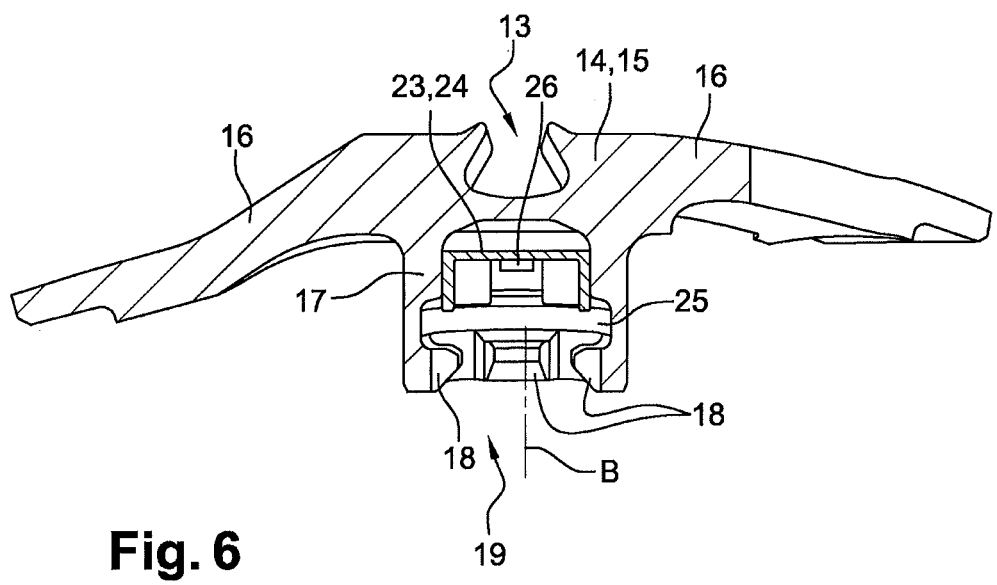
Figure 7:
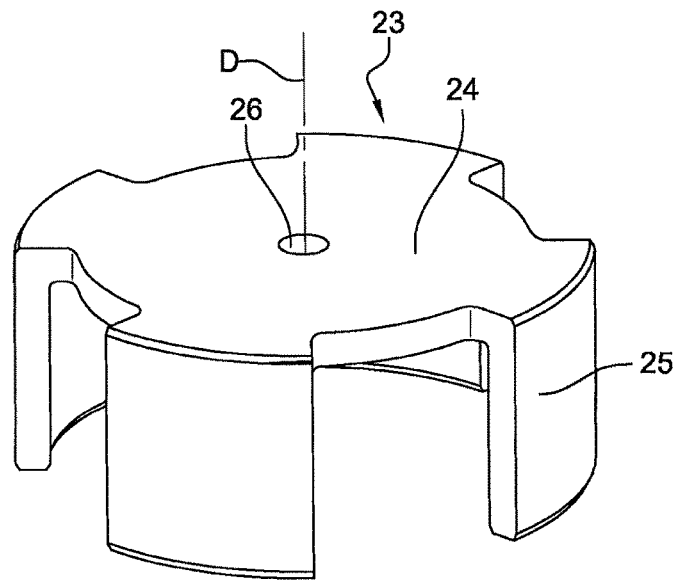
Figure 8:
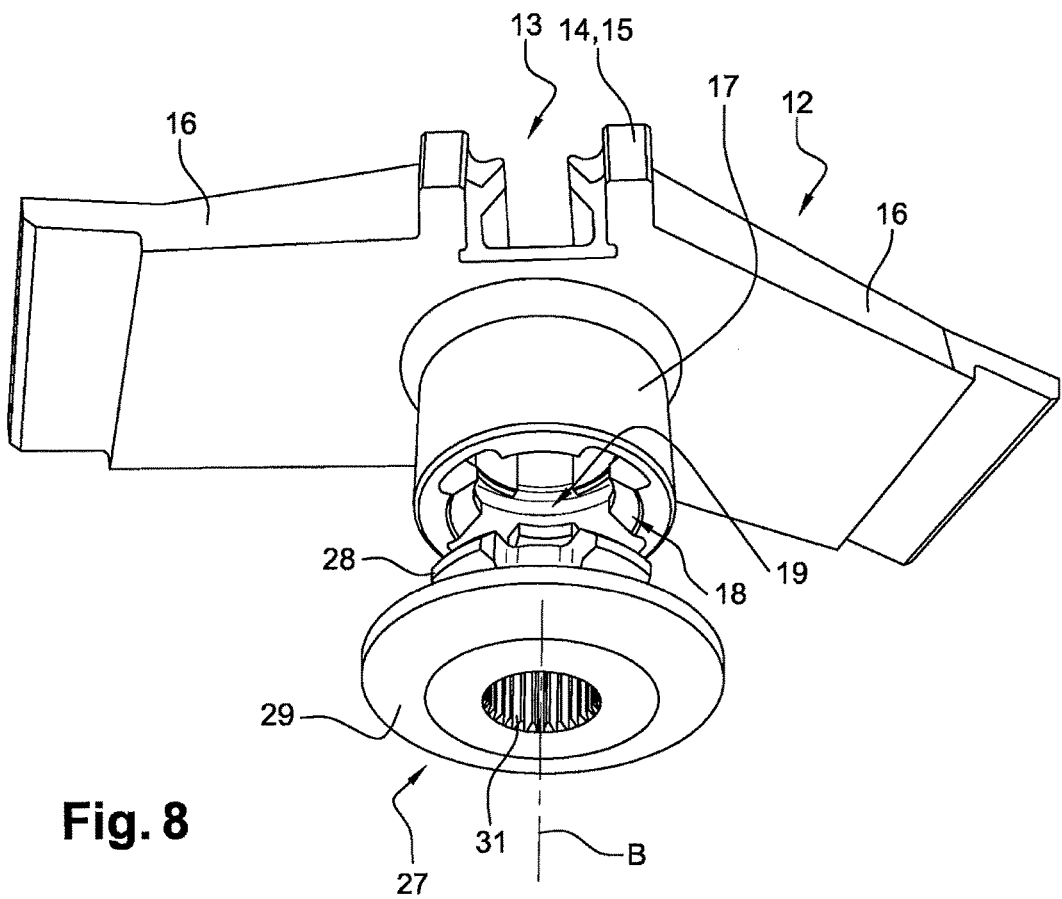
Figure 9:
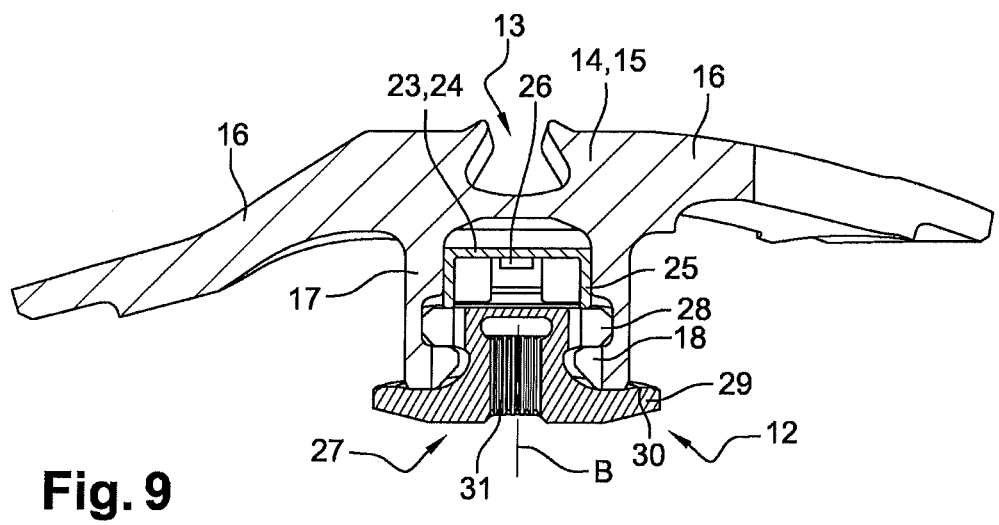
Figure 10:
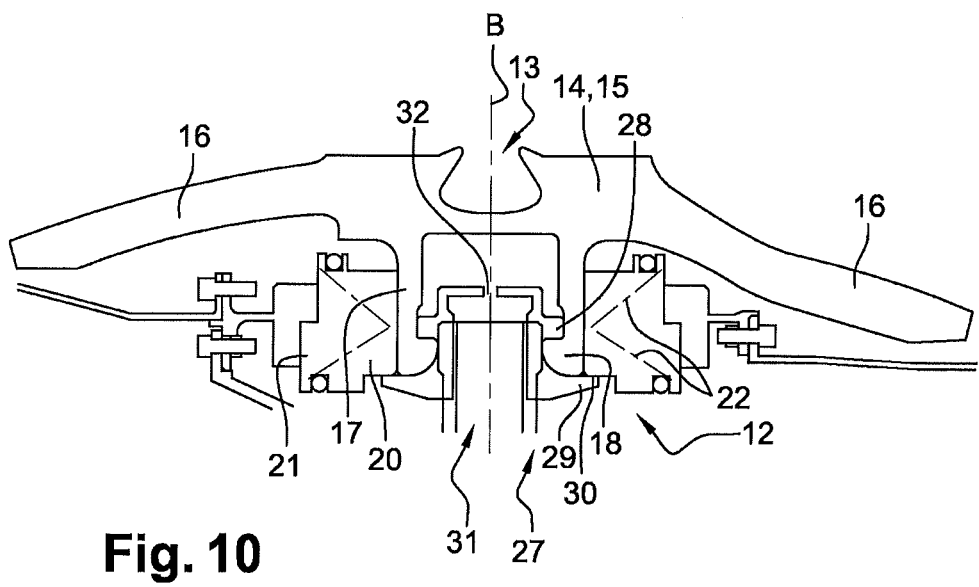
Figure 11:
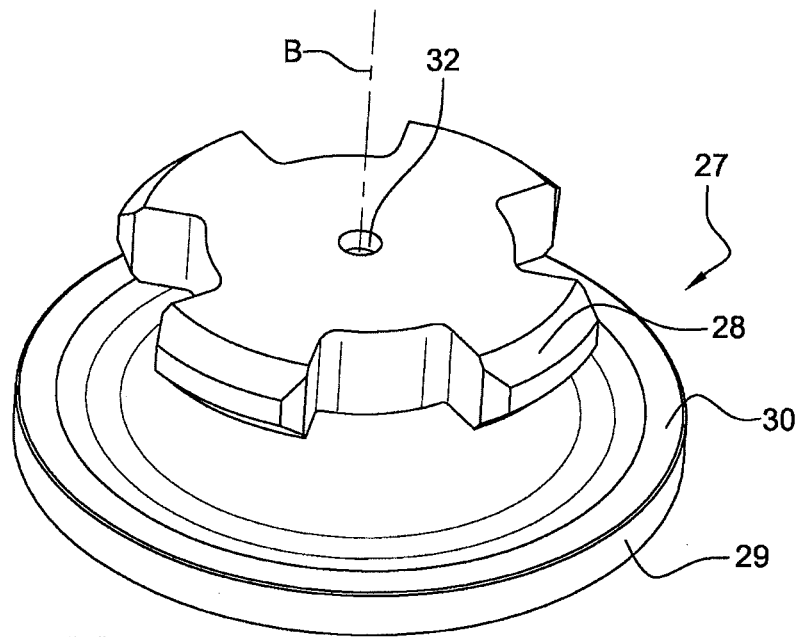
Figure 12:
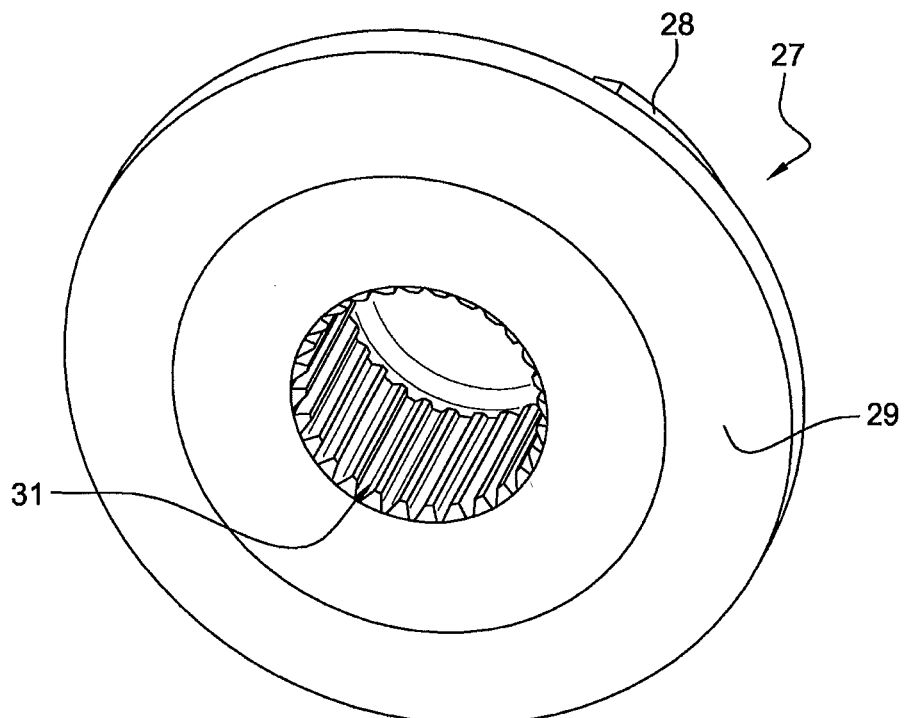
Figure 13:
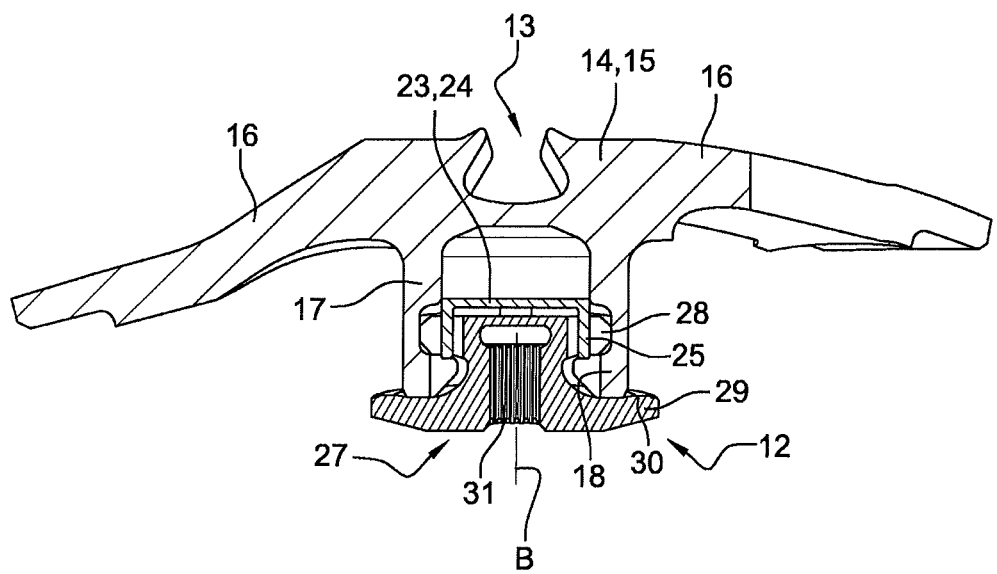
Figure 14:
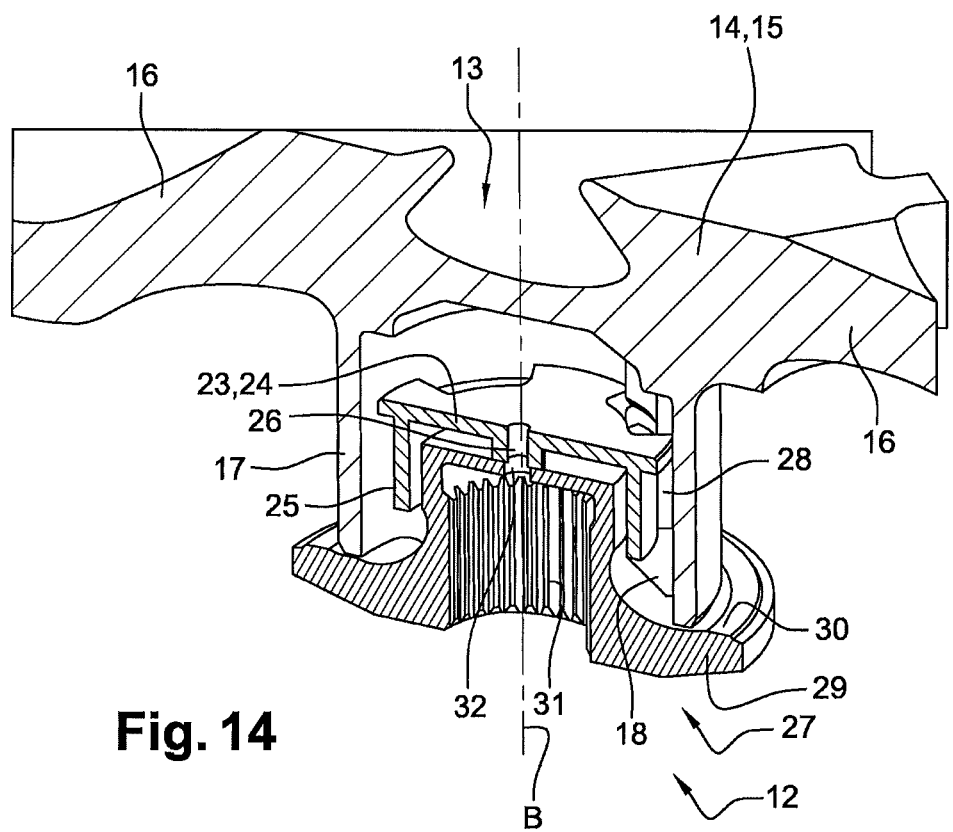

The invention will be better understood, and other details, characteristics and advantages of the invention will appear upon reading the following description given by way of a non restrictive example while referring to the appended drawings wherein:

FIG. 1 is a perspective view of a turbomachine with non streamlined propellers according to the invention;

FIG. 2 is a schematic sectional view of the turbomachine of FIG. 1, along the axis of the turbomachine, FIG. 3 is a perspective view of the support, FIG. 4 is a schematic view of the device according to the invention, FIG. 5 is a perspective view illustrating the insertion of the locking component into the support foot, FIG. 6 is an axially sectional view of the support and the locking component, FIG. 7 is a perspective view of the locking component, FIG. 8 is a perspective view illustrating the insertion of the hub into the support foot, FIG. 9 is a sectional view of the support, the hub and the locking component in the release position thereof, FIG. 10 is an axially sectional view of a part of the turbomachine equipped with a device according to the invention, FIGS. 11 and 12 are perspective views of the hub, FIGS. 13 and 14 are sectional views of the support, the hub and the locking component in the release position thereof, FIGS. 1 and 2 show a «open rotor» or «unducted fan» turbomachine 1 which comprises, in the downstream direction, along the direction of the flowing of gas inside the turbomachine 1, a compressor 2, an annular combustion chamber 3, a high-pressure turbine 4, and low-pressure turbines 5 which are contra-rotating, i.e. which rotate in two opposite directions about the longitudinal axis A of the turbomachine 1.

Each one of these downstream turbines 5 is rotationally integral with an external propeller 6, 7 which radially extends outside the nacelle 8 of the turbomachine 1, with such nacelle 8 being substantially cylindrical and extending along the axis A about the compressor 2, the combustion chamber 3, and the turbines 4, 5.

The air flow 9 which goes into the turbomachine is compressed (2) then it is mixed with fuel and burnt in the combustion chamber 3, with the combustion gases then entering the turbines 4, 5 to drive the propellers 6, 7 which supply most of the thrust generated by the turbomachine into rotation. Combustion gases going out of the turbines 4, 5 are expelled through a nozzle, to increase thrust.

The propellers 6, 7 are positioned coaxially one behind the other and comprise a plurality of blades 10 distributed at regular intervals around the axis A of the turbomachine. Such blades 10 extend substantially radially and are of the variable pitch type, i.e. they can rotate about their axes so as to optimize their angular position depending on the operating conditions of the turbomachine 1.

The position of the blades 10 is controlled through shafts 11 which radially extend relative to the axis A of the turbomachine 1.

Each propeller 6, 7 comprises a rotor element consisting of a polygonal ring (not shown) which extends about the axis A and which comprises a plurality of substantially cylindrical radial recesses wherein are engaged devices 12 enabling the mounting of blades 10 and the rotation of blades 10 about the axes B, each one being perpendicular to the axis A. In the following, an element distant from the axis A of the turbomachine 1 will be called distal or high. Reversely, an element close to the axis A will be called proximal or low.

As is known per se, the proximal end of each blade 10 is provided with a foot having a dovetail section, which is engaged into and held in a groove 13 arranged in a distal part 14 of a support 15 of the device 12 according to the invention. Such distal part 14 further comprises two so-called counterweight arms, able to generate a torque ensuring the feathering of the propeller 10 in case of failure. Feathering a propeller consists in placing the blade 10 in a position in which the trailing edge extends in the continuation of the leading edge of the blade 10, in the air flow direction. Each blade and more generally the propeller is positioned parallel to the axis of the air flux flow around it.

The support 15 further comprises a hollow proximal part 17, also called the foot, having a general cylindrical shape. Engagement teeth 18 radially protrude inwards from the internal surface defining the internal recess 19 of the foot 17. Such teeth 18 are four in number and are regularly distributed over the periphery.

The support 15 is for instance made of a titanium alloy.

The foot 17 of the support 15 is mounted in a bearing of the device, which is in turn mounted in a recess of the propeller ring.

The bearing comprises an internal annular part 20 and an external annular part 21 which are co-axial (FIG. 10) and capable of pivoting relative to each other around the axis B. Bearing components, here rolls, represented by their axis lines 22 are mounted between the internal and external annular parts 20, 21. Such parts 20, 21 may form raceways for the rolls 22. On the contrary, intermediary rings radially mounted between the internal and external 20, 21 parts may form the raceways. The internal and external annular parts 20, 21 are made of steel, for instance.

Axial and radial are used relative to the support 15 pivot axis B in the bearing 20, 21, which also is the axis of the blade 10, the foot 17 and the internal and external 20, 21 parts of the bearing.

In the embodiment shown in FIG. 10, the bearing comprises two rows of rolls 22, i.e. a proximal row and a distal row. The rolls 22 are conical or cylindrical and extend along an angle ranging from 20 to 45° with the axis B.

The foot is tight- or shrunk-fit in the internal part 20 of the bearing. Shrunk surfaces are continuous cylindrical surfaces. Such shrinking is obtained over the entire height and the entire circumference of the foot 17. It is obtained by heating the internal part 20 of the bearing (which expands), and then inserting the foot 17 into said internal part 20 of the bearing. When cooling, the internal part 20 retracts, so as to provide a close fit (shrinking) of the foot 17 in the internal part 20.

A locking component 23 is then mounted in the foot 17 recess 19. The latter comprises a substantially round base 24, at the radially external periphery of which teeth 25 axially extend downwards, i.e. towards the axis A. The teeth 25 are for instance four in number and are distributed at regular intervals over the whole periphery. Each tooth 25 has a semi-circular section and angularly extends on the whole or almost the whole of the angular sector between two engagement teeth 18 of the foot 17. The base 24 comprises a tapped hole 26 in the center thereof.

FIG. 6 shows the locking component 23 in the upper part of the foot 17 recess 19 (with such recess opening downwards): the locking component 23 is in the stand-by or release position.

A hub 27 is then inserted into the foot 17 recess 19. The latter is for instance made of a Nickel-based superalloy, such as Inconel 718, has a shape for revolving about the axis B and comprises engagement teeth 28 which radially extend outwards at the high or distal end thereof, as well as a rim 29 radially extending outwards at the low or proximal end thereof. The rim 29 comprises an annular bearing surface 30 oriented upwards. The teeth 28 of the hub 27 angularly extend over the whole or almost the whole of the angular sector separating two engagement teeth 18 of the foot 17.

The hub 27 further comprises a central hole 31 having axially oriented ribs, with said hole 31 being intended to receive the ribbed distal end of the matching shaft 11. The hole 31 opens at the proximal end of the hub 27 but does not open at the distal end of the hub 27. A hole 32 having a smaller diameter goes through the distal end of the hub 27 and opens in the hole 31.

When mounting the hub 27 in the foot 17 recess 19, the hub 27 is placed in a first angular position relative to the foot 17, so that the teeth 28 of the hub 27 are always inserted between two teeth 18 of the foot 17. The hub 27 can then be introduced into the foot 17 recess 19, by translation along the axis B. When the resting surface 30 of the rim 29 of the hub 27 comes to rest onto the proximal end of the internal part 20 of the bearing, the hub 27 is pivoted about the axis B, to a second angular position relative to the foot 17, so that the hub 27 is axially held in position by the teeth 28 of the hub 27 axially resting on the teeth 28 of the foot 17.

A tool (not shown) comprising a threaded distal end is inserted through the holes 31 and 32 of the hub 27 and then is screwed into the tapped hole 26 of the locking component 23. Pulling such tool makes it possible to draw the locking component 23 downwards, so that the teeth 25 of the locking component 23 are circumferentially inserted between the engagement teeth 18 of the foot 17 and of the hub 17. The locking component 23 is then in its locking position (or low position), as illustrated in FIGS. 13 and 14. It may be held in such position using any suitable fastening means, for instance using one or several screw(s), not shown.

Such a device 12 thus makes it possible to obtain a tight assembling or fitting of the foot 17 in the internal part 20 of the bearing, so as to limit the vibrations and prevent any premature damage to the bearing. Such fitting is continuously provided on the whole cylindrical external surface of the foot 17. Besides, the engagement elements 18, 28 and the rim 29 make it possible to support very high centrifugal stress, due to the large surfaces in contact.

The invention claimed is:

1. A device for a non-streamlined propeller with blades having variable pitch of a turbomachine, the device comprising a support intended to support a blade in a distal area and including a cylindrical foot in a proximal area, a bearing comprising a radially internal annular section and a radially external annular section, with said radially internal and external annular sections being capable of pivoting with respect to each other, with the foot being mounted in said internal section of the bearing, wherein the device comprises a hub mounted in the foot, with said hub comprising a rim comprising a resting face oriented towards a distal end of the hub and resting on the radially internal annular section of the bearing, with the hub comprising engagement elements and the foot comprising complementary engagement elements able to enable the axial insertion of the hub into the foot of the support, in a first angular position of the hub relative to said foot and able to axially hold the hub in position in said foot, in a second relative angular position, through an axial resting of the engagement elements of the hub against the complementary engagement elements of the foot, or vice versa, with the device further comprising a locking component able to lock the hub relative to the foot, in the second angular position.

2. A device according to claim 1, wherein the foot comprises a radially external cylindrical surface, with said foot being tightened or shrunk in a cylindrical recess of the radially internal annular section of the bearing.

3. A device according to claim 1, wherein the engagement elements have teeth.

4. A device according to claim 3, wherein the locking component has at least one tooth mounted between two engagement teeth of the foot and the hub.

5. A device according to claim 1, wherein the locking component is capable of sliding relative to the foot and to the hub, between a locking position in which it prevents the hub from rotating relative to the foot, and a release position in which it enables the rotation of the hub relative to the foot.

6. A device according to claim 5, comprising means for fixing the locking component in the locking position thereof.

7. A device according to claim 1, wherein the hub comprises a ribbed recess opening at the distal end of the hub.

8. A device according to claim 3, wherein the foot comprises a recess, and complimentary engagement teeth which radially extend inwards from an internal surface of the recess, in an area of a proximal end of the foot, with the hub comprising engagement teeth which radially extend outwards, in an area of the distal end of the hub, and cooperating with the complimentary engagement teeth of the foot, with the locking component being engaged into the recess of the foot and comprising teeth inserted each time between the teeth of the foot and the hub, so as to prevent the hub from rotating relative to the foot.

9. A device according to claim 1, wherein said radially internal and external annular sections of the bearing are suitable to pivot relative to each other.

10. A turbomachine, comprising at least one device according to claim 1.

* * * * *